United States Patent [19]
Takamura

[11] Patent Number: 5,998,731
[45] Date of Patent: Dec. 7, 1999

[54] ABSORBED TYPE LIGHTNING ROD AND ABSORBED TYPE LIGHTNING DISCHARGING APPARATUS

[75] Inventor: Mitsunori Takamura, Tochigi, Japan

[73] Assignee: Etsuko Takamura, Tochigig, Japan

[21] Appl. No.: 08/922,480

[22] Filed: Sep. 3, 1997

[30] Foreign Application Priority Data

Jan. 16, 1997 [JP] Japan ..................................... 9-039663
Jul. 2, 1997 [JP] Japan ..................................... 9-176918

[51] Int. Cl.$^6$ ................................................... H02G 13/00
[52] U.S. Cl. .................................. 174/3; 174/5 R; 174/6; 174/51; 361/117
[58] Field of Search .............................. 174/1, 2, 3, 5 R, 174/6, 7, 51, 4 R; 361/117

[56] References Cited

U.S. PATENT DOCUMENTS

| 29,933 | 9/1860 | Wooster | 174/4 R |
|---|---|---|---|
| 93,609 | 8/1869 | Foot | 174/3 |
| 1,467,922 | 9/1923 | Creighton | 174/4 R |
| 1,513,931 | 11/1924 | Rea | 174/4 R |
| 4,652,694 | 3/1987 | Goldman et al. | 174/3 |

FOREIGN PATENT DOCUMENTS

| 2575871 | 7/1986 | France | 174/3 |
|---|---|---|---|
| 2697379 | 4/1994 | France . | |
| 64-10600 | 1/1989 | Japan . | |
| 5-121192 | 5/1993 | Japan . | |
| 2026783 | 2/1980 | United Kingdom | 174/7 |
| 9402980 | 2/1994 | WIPO | 174/2 |

*Primary Examiner*—Kristine Kincaid
*Assistant Examiner*—Dhiru R Patel
*Attorney, Agent, or Firm*—Liniak, Berenato, Longacre & White

[57] ABSTRACT

The lightning rod of the present invention is an absorbed type lightning rod which absorbs all lightning stroke current. This absorbed type lightning rod includes a conductive pole, a circular cone-shaped primary rod having an acute point, placed on the top of the pole, and a secondary rod having an acute point lower than that of the primary rod. In this lightning rod, the lightning induction of the primary rod is enhanced by the secondary rod.

9 Claims, 12 Drawing Sheets

F I G. 7A
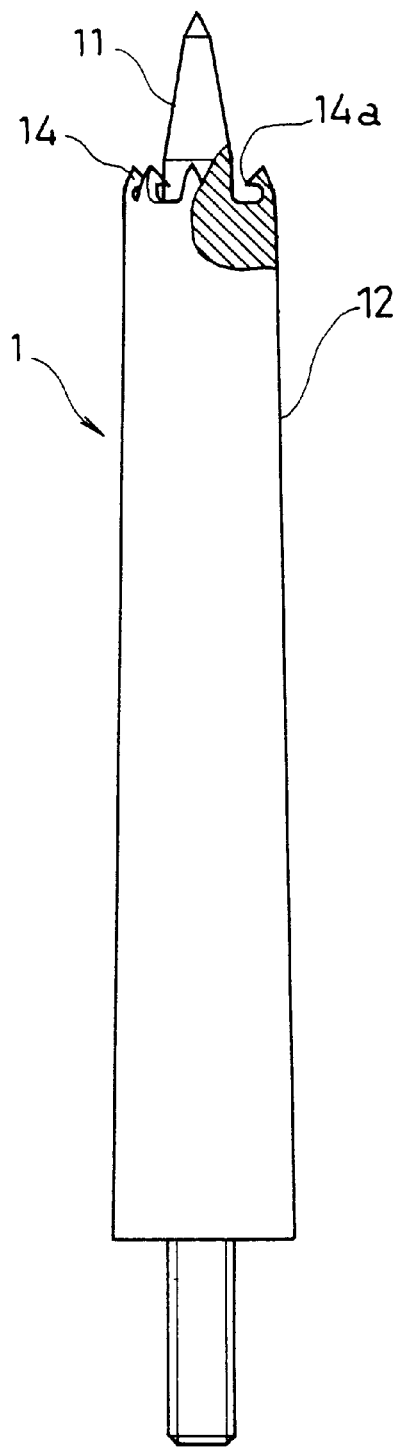
F I G. 7B
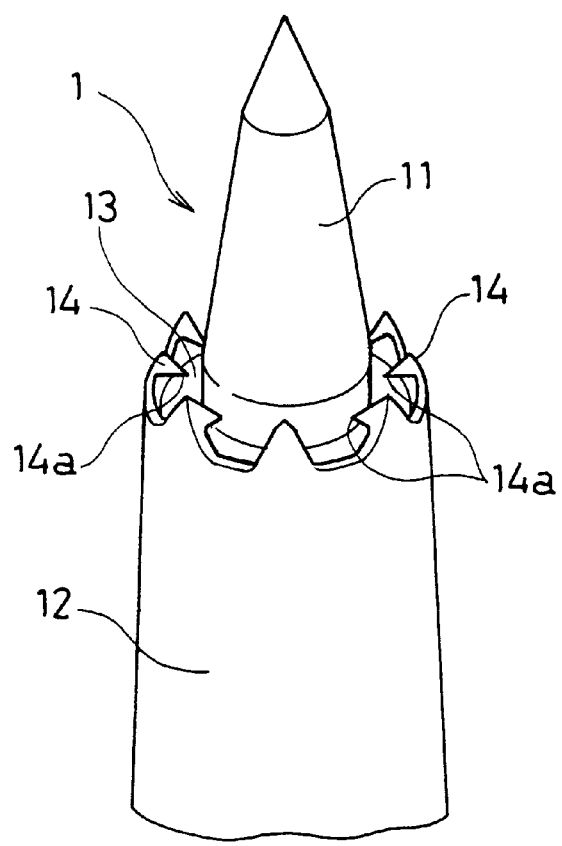

ABSORBED TYPE LIGHTNING ROD AND ABSORBED TYPE LIGHTNING DISCHARGING APPARATUS

BACKGROUND OF THE INVENTION

1. Field of the Invention

The present invention relates to absorbed type lightning rod which absorbs lightning discharge current and which discharges the current to the ground to prevent the damage due to lightning, and an absorbed type lightning discharging apparatus utilizing the lightning rod.

2. Description of Related Art

When the thunder clouds approach, a conductive sharp material at the ground starts discharge to the thunder clouds (corona discharge or upward streamer), and the thunder clouds also start discharge to the conductive sharp material (downward streamer). Further, when insulation of air is lost under some weather condition, both discharges are coupled (called coupled streamer). This phenomenon is called cloud-to-ground discharge or lightning stroke. As the tip of the sharp material is more acute, the discharge to the thunder clouds occurs more.

Some conventional lightning rods are shown in FIGS. 1A, 1B, 2, 3A, 3B. As shown in FIGS. 1A and 2, a lightning rod B receives the lightning discharge current E (hereinafter called lightning stroke current) due to the lightning stroke X at a point, and discharges the current E to the ground. The lightning rod B also splashes the lightning stroke current, which means the lightning rod cannot absorb, (hereinafter called splashed lightning current E1) outsides the certain area (safety area). From the research results, it is well known that the corona discharge occurs more and lightning absorptivity becomes higher as the point of the lightning rod B is more acute. Accordingly, the point of the lightning rod B is preferably acute, and generally, "Franklin Rod" that is a circular cone-shaped pointed rod is used.

The lightning rod B has higher lightning induction and higher lightning absorptivity as the point thereof becomes more acute; however, the splashing area of the splashed lightning current E1 becomes narrow. Therefore, the point angle is made approximately 90 degrees to secure.

The modified lightning rod is disclosed in Japanese Patent Laid-open No. Hei 5-121192. This rod is that as shown in FIGS. 3A, 3B, a ring B1 is provided at the middle of the lightning rod B and that the angle between the point of the lightning rod and the circumference of the ring B1 (hereinafter called splash angle) is in the range of 90–180 degrees. For example, in FIG. 3A, the splash angle is 90 degrees, and in FIG. 3B, it is 126 degrees. In this lightning rod B, the point angle of the lightning rod B1 is made 60 degrees to maintain the lightning induction and the safety area widen owing to the ring B1; however, since the splashed lightning current E1 still exists, the secondary disaster due to the splashed lightning current E1 struck the lightning rod B1 cannot be avoided.

The modified lightning rod is also disclosed in Japanese Laid-open No. Hei 1-10600 and French application No. 9212860. The object of these inventions is to enhance the lightning induction by modifying the shape of the point of the lightning rod but the prevention of the secondary disaster is not the object.

The lightning stroke current conducted to the ground with the lightning rod B momentary becomes large, and very high potential is generated at an earth electrode C in the ground (see FIG. 2). The conventional earth electrode C is a thin metal plating rod having a conductive plate as a primary electrode and it is driven to the ground until the desired earthing resistance (Japanese standard is less than 10 ohms) is obtained. Accordingly, the earthing resistance in conformity with the standard is obtained but the instantaneous lightning stroke current cannot instantaneously and smoothly be discharged to the ground. In result, the lightning stroke current is stopped at the earth electrode C and flows back to the lightning rod B (see FIG. 1B). This reverse current E2 generates the flush over and the excess electromagnetic induction. Moreover, it generates the Joule's heat, which induces the tertiary disaster such as the damage of the lightning rod B.

Further, since the earth electrode C such as a conductive plate and a metal rod is only driven to the ground, the some space is formed between the earth electrode and the ground, which decreases the discharge effect.

The lightning stroke current absorbed by the lightning rod flows through the surface of the conductive wire. Conventionally, since the lightning rod and the earth electrode are coupled only with a conductive wire, the lightning stroke current is leaked from the surface of the conductive wire. If the object to be protected is a building, the leakage current is not a problem. However, if the object to be protected is an antenna or electric line, the leakage current causes the bad influences to the object to be protected.

SUMMARY OF THE INVENTION

It is an object of the present invention to provide an absorbed type lightning rod which actively absorbs the lightning stroke current to prevent the secondary and tertiary disasters that the conventional lightning rod B cannot prevent.

In order to accomplish the above object, an absorbed type lightning rod of the present invention comprises a pole having the conductivity, a circular cone primary rod having an acute point, provided at the top of the pole, and a secondary rod having an acute point lower than the primary rod, formed on the periphery of the primary rod at the same concentric circle as the primary rod. The secondary rod and the primary rod are separated by a bowl-shaped receiving portion.

Here, a cone angle of a truncated cone of the primary rod is preferably smaller than the point angle of the primary rod. Further, the acute point of the secondary rod is preferably faced toward the point of the primary rod.

Further, the secondary rod can be constituted by a plurality of pointed portions formed by dividing an outer wall of the bowl-shaped receiving portion into plural portions. Alternatively, the secondary rod can be constituted by a protrusion portion formed on a periphery of an outer wall of the bowl-shaped receiving portion.

Furthermore, an inward secondary point can be formed at the periphery of the secondary rod so as to be faced toward the point of the primary rod.

An absorbed type lightning discharging apparatus of the present invention comprises 1) an absorbed typed lightning rod including a pole having the conductivity, a circular cone primary rod having an acute point, provided at the top of the pole, and a secondary rod having an acute point lower than the primary rod, formed on the periphery of the primary rod at the same concentric circle as the primary rod; the secondary rod and the primary rod being separated by a bowl-shaped receiving portion, 2) a conducting unit for conducting lightning stroke current received by the absorbed typed lighting rod into ground, and 3) a discharge accelerating earth electrode for smoothly and instantaneously discharging the lightning stroke current flown through the conducting unit into ground. The earth electrode comprises a primary electrode and a discharge pointed portion.

Here, the gap between the discharge accelerating earth electrode and the ground is preferably filled by an earthing resistance reducing agent.

Further, the absorbed typed lightning rod may be fixed to an object to be protected over an insulating attachment formed of an insulator, and the conducting unit may be a shielded conducting unit.

According to the absorbed type lightning rod of the present invention, the secondary disaster described above which the conventional lightning rod cannot be prevented can be prevented. Moreover, the absorbed type lightning rod enhances the lightning induction, so that the disaster due to the lightning can be prevented in the wide area.

According to the absorbed type lightning discharging apparatus utilizing the absorbed type lightning rod, the discharge to the ground can instantaneously and smoothly be performed while the desired earthing resistance is obtained. Accordingly, the reverse current is prevented, and the tertiary disaster can be prevented.

In the present invention, the earthing resistance reducing agent is used, so that the gap between the earth electrode and the ground can be filled, which enhances the discharge effect. Further, the reducing agent prevents the corrosion of the earth electrode.

Furthermore, when the absorbed type lightning rod is installed to the object to be protected, if the shielded conducting unit and the insulating attachment are used, the building which is easily influenced by the leakage current can be appropriately protected.

BRIEF DESCRIPTION OF THE DRAWINGS

FIGS. 7A and 7B are views showing an absorbed type lightning rod according to the second embodiment of the present invention.

PREFERRED EMBODIMENTS OF THE INVENTION

Figure 1A:
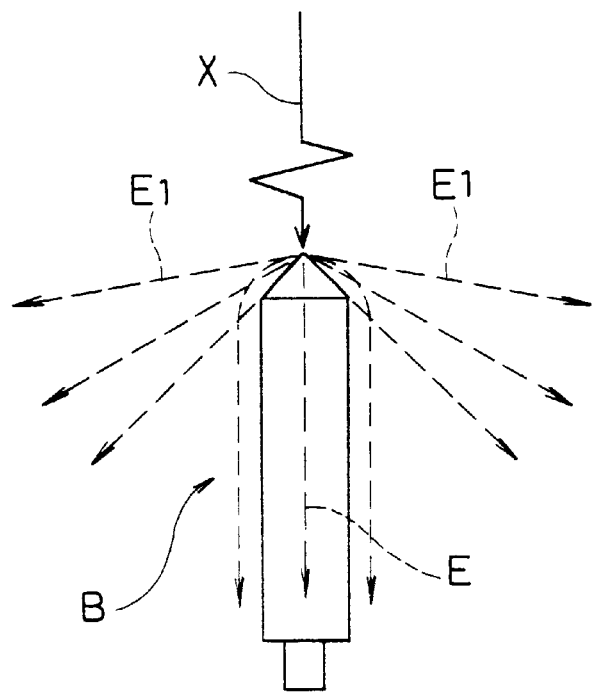
FIGS. 1A and 1B are views showing the splashed lightning stroke current and the reverse current at a conventional lightning rod.
Figure 1B:
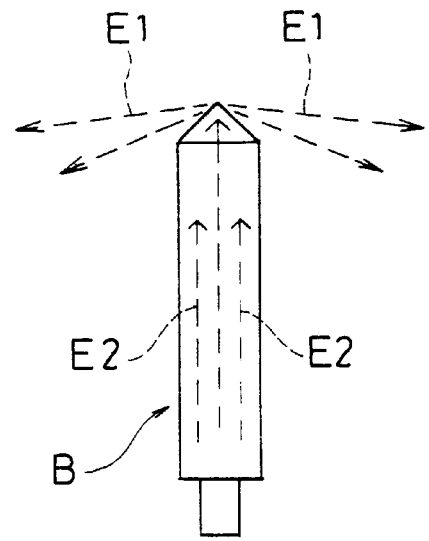
Figure 2:
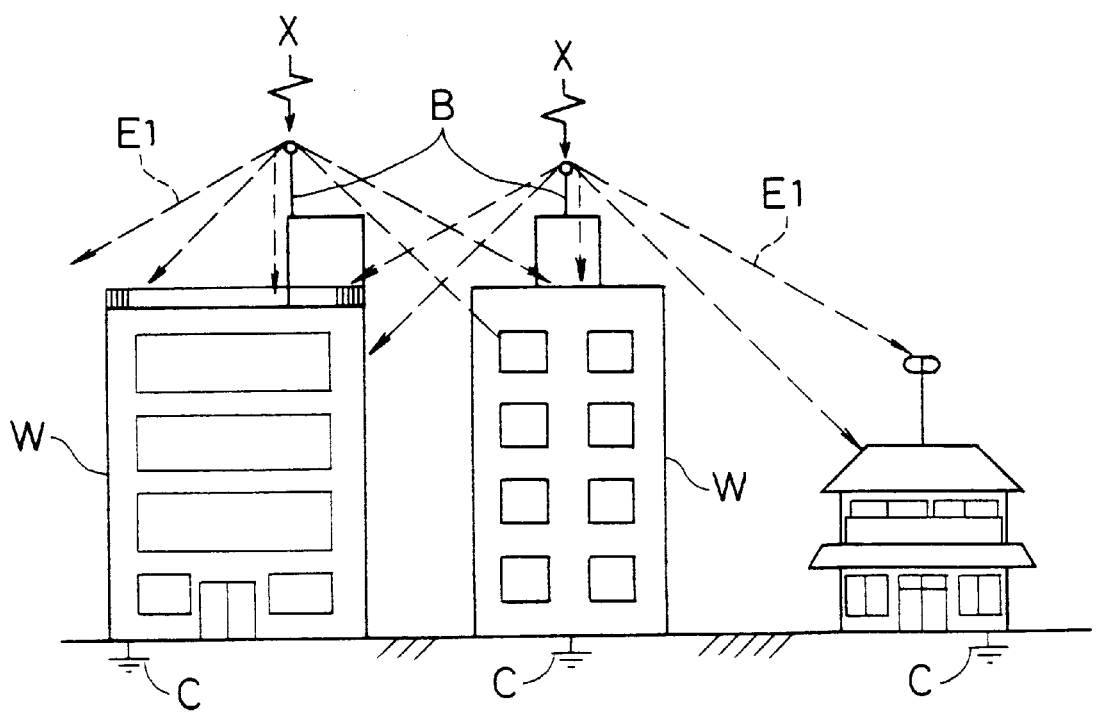
FIG. 2 is a schematic view showing a lightning rod installed on an object to be protected.
Figure 3A:
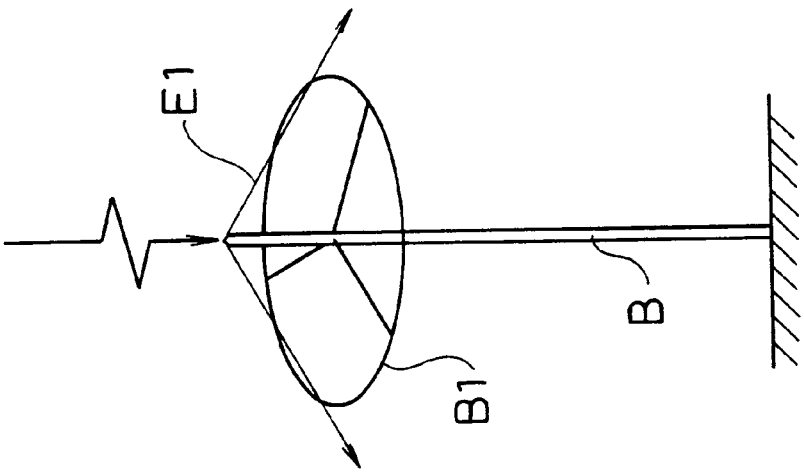
FIGS. 3A and 3B are schematic views showing the conventional modified lightning rod.
Figure 3B:
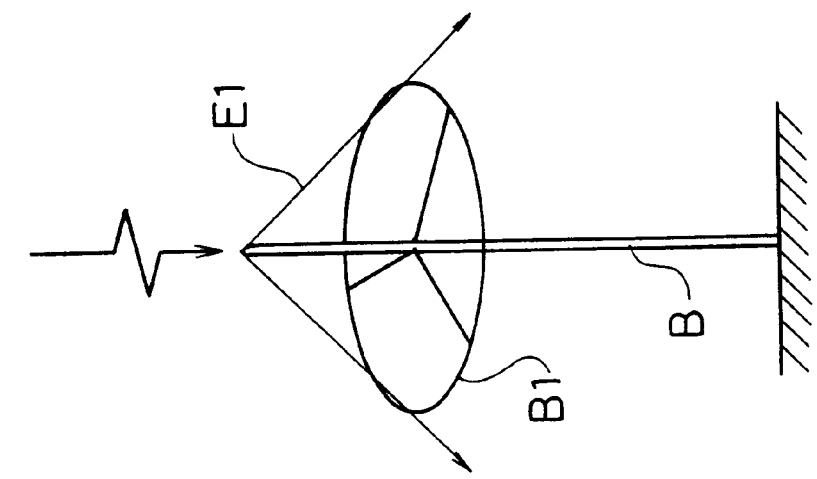

The preferred embodiments of the present invention will be described hereinafter with reference to the accompanying drawings. In the following description and the drawings, the same reference numerals are used for the same components and repetitive description on the same components will be omitted.

Absorbed type lightning rods of the present invention are different from the conventional lightning rod in that the lightning rod of the present invention actively absorbs the lightning stroke current due to the lightning stroke and discharges all absorbed lightning current to the ground. Accordingly, the secondary disaster due to the splashed lightning current is prevented, and the safety is improved.

Figure 4A:
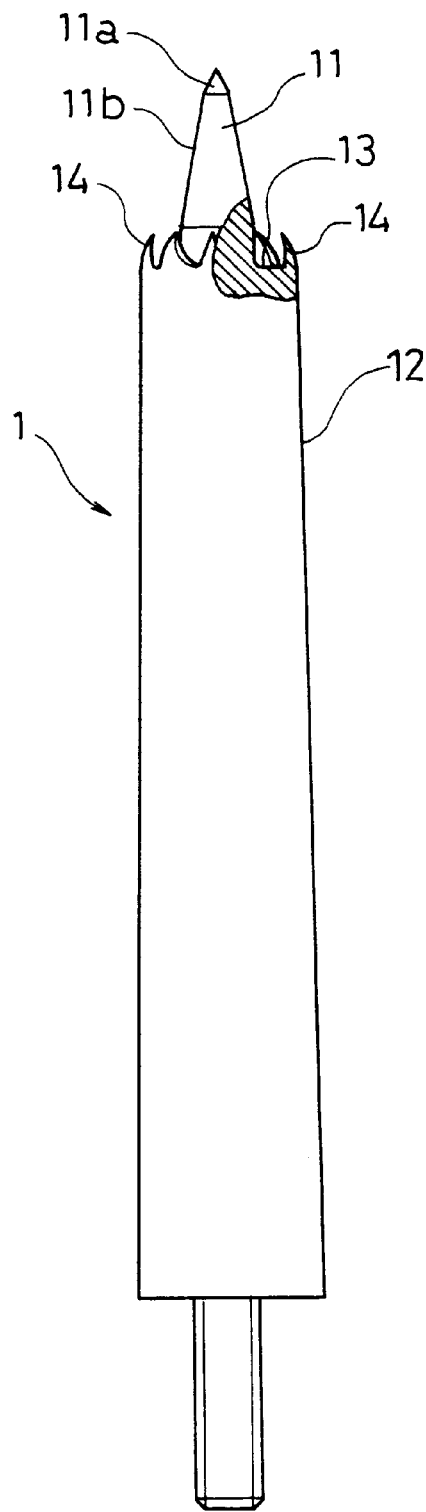
FIGS. 4A and 4B are views showing an absorbed type lightning rod according to the first embodiment of the present invention.
Figure 4B:
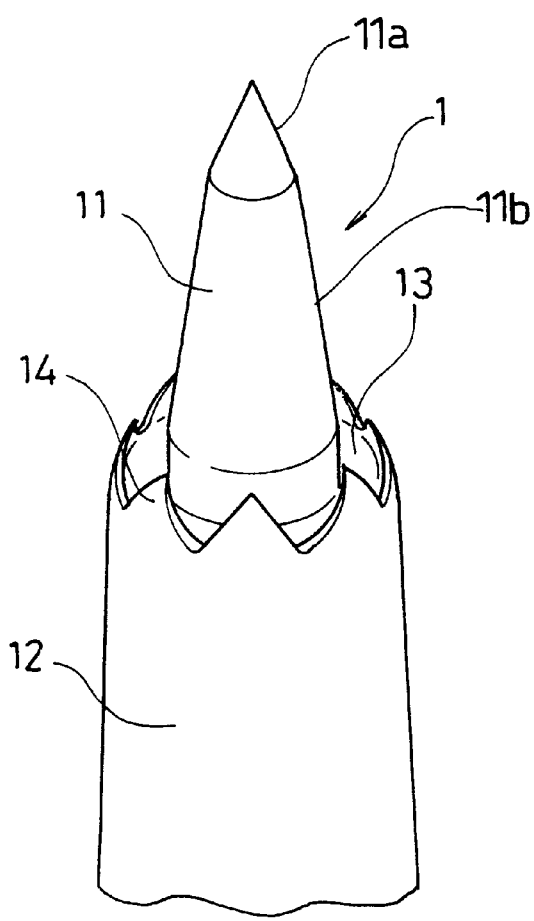
Figure 5:
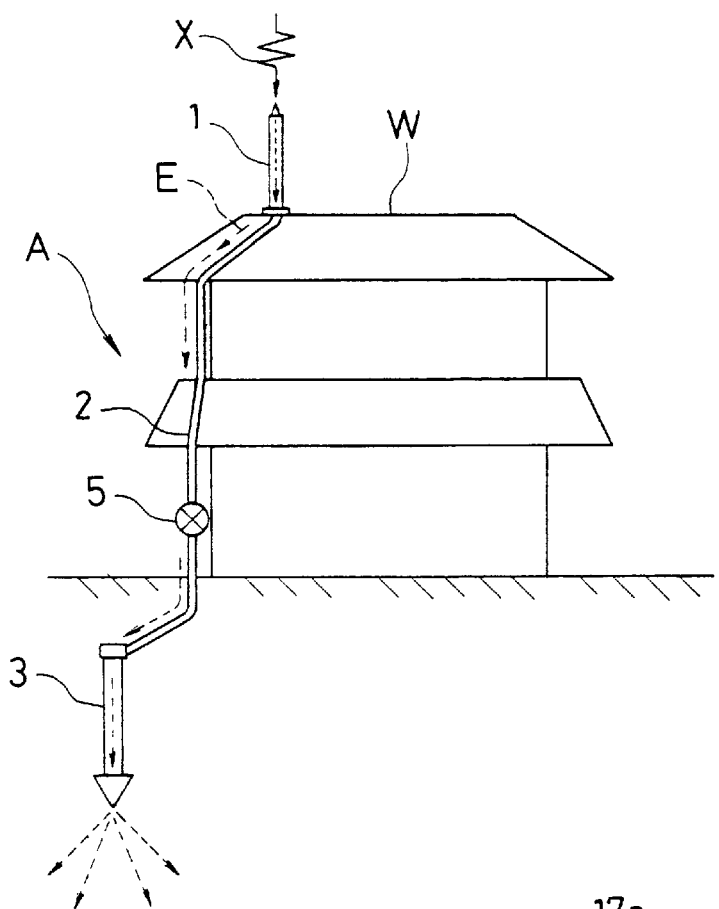
FIG. 5 is a schematic view showing an absorbed type lightning discharging device utilizing the absorbed type lightning rod of the present invention.
Figure 6:
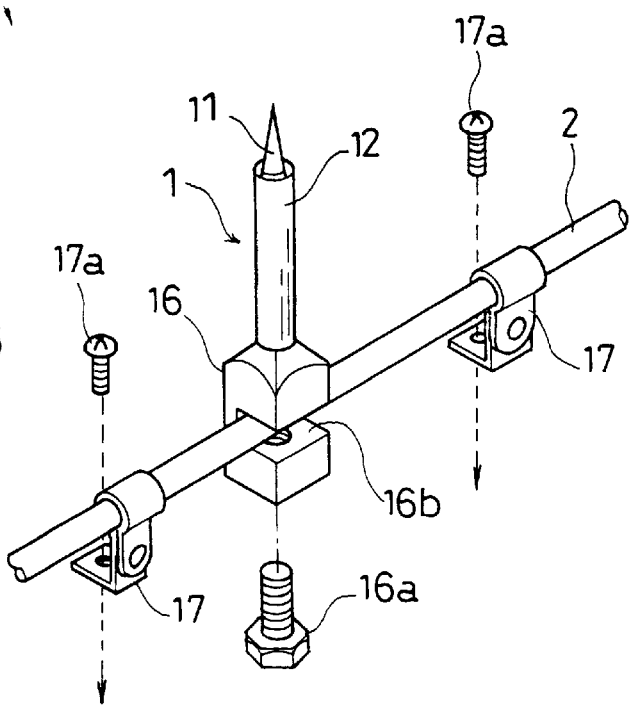
FIG. 6 is an enlarged view showing the absorbed type lightning rod.

The first embodiment of the absorbed type lightning rod will be described. FIGS. 4A and 4B show a lightning rod 1 according to the first embodiment of the present invention. FIG. 5 shows a device for discharging the lightning stroke current E utilizing the absorbed type lightning rod 1 (hereinafter this device is called lightning discharging device A). FIG. 6 is an enlarged view of the absorbed type lightning rod 1.

The absorbed type lightning rod 1 comprises a conductive pole 12, a circular cone-shaped primary rod 11 having an acute point, and a secondary rod having an acute point lower than the primary rod 11 at the same concentric circle as the primary rod 11 over a bowl-shaped receiving portion 13. In this embodiment, the secondary rod is formed by dividing the outer wall of the bowl-shaped receiving portion 13 into plural pointed portions 14. The end of the pole 12 is coupled to a conducting unit 2 for conducting a lightning stroke current E to the ground as shown in FIG. 5.

The primary rod 11 is acute, so that it absorbs the lightning stroke current E and induces the lightning stroke. Further, the pointed portions 14 that are the secondary rod is also acute, so that it helps the lightning induction of the primary rod 11. Furthermore, since it is known that if the generation of the upward streamer is accelerated, the lightning induction is also enhanced, the points of the pointed portions 14 are turned to the point of the primary rod 11 to accelerate the generation of the upward streamer to enhance the lightning induction.

In order to use the lightning rod 1 for a long time, the absorbed type lightning rod 1 is chromed to prevent the corrosion. In this case, if the point 11a of the primary rod 11 is too acute, the chrome is accumulated at the point 11a. In order to avoid this inconvenience, if the point 11a with a truncated cone 11b is formed obtuse, the efficiency of the absorption of the lightning stroke current is lowered and the lightning induction becomes weak. Therefore, in the present embodiment, the point angle of the point 11a is made larger than the cone angle of the truncated cone 11b to solve the above-described inconvenience and to maintain the efficiency of the absorption of the lightning stroke current and the lightning induction. It should be noted that from the inventor's experiments, the accumulation of the chrome is prevented with the point angle of the point 11a of 50 degrees or above.

With this absorbed type lightning rod of the present embodiment, the primary rod 11 is formed acute, so that it can absorb almost all the lightning stroke current E. Even if the splashed lightning current E1 that is not absorbed by the primary rod 11 occurs, the splashed lightning current E1 is very small and splashes in the very small area, so that the splashed lightning current E is received by the bowl-shaped receiving portion 13. The received lightning stroke current E is either absorbed and conducted to the pole 12 or escaped from each space between the pointed portions 14, so that the lightning stroke current E is eliminated and does not cause the secondary disaster. The absorbed lightning stroke current E is conducted to the conducting unit 2 through the pole 12.

Next, the second embodiment of the absorbed type lightning rod will be described. FIG. 7A shows the absorbed type lightning rod according to the second embodiment of the present invention, and FIG. 7B shows the enlarged view of the absorbed type lightning rod of FIG. 7A. As shown in FIGS. 7A and 7B, the absorbed type lightning rod 1 of the present embodiment is that an inward secondary point 14a is placed at the top of the pointed portion 14 described in the first embodiment so as to face toward the primary rod 11. With this absorbed type lightning rod 1, the points of the pointed portions 14 and the inward secondary points 14a enhance the lightning induction property of the primary rod 11, and the lightning stroke current E received by the bowl-shaped receiving portion 13 can efficiently be conducted to the pole 12.

Figure 8A:
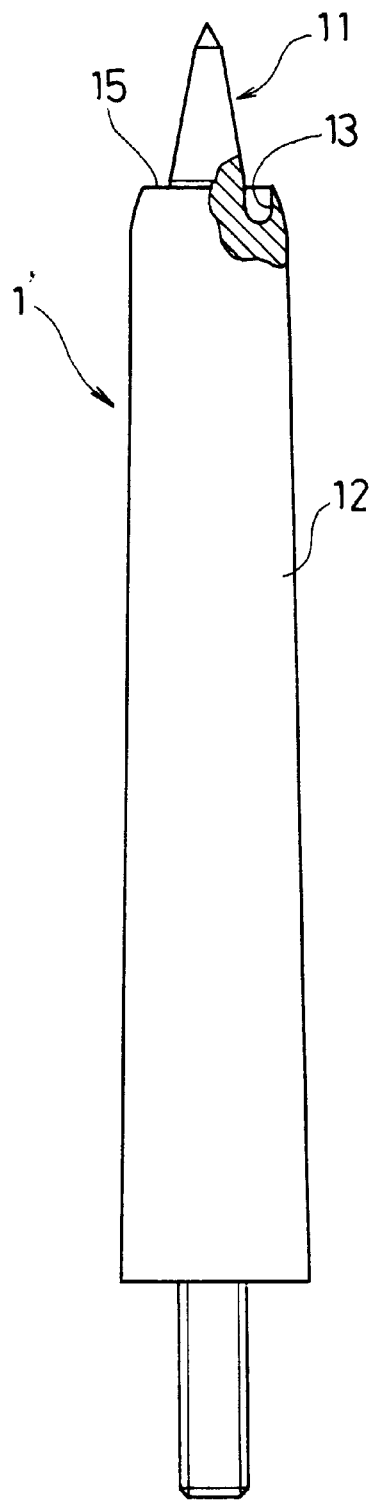
FIGS. 8A and 8B are views showing an absorbed type lightning rod according to the third embodiment of the present invention.

Next, the third embodiment of the absorbed type lightning rod will be described. FIG. 8A shows the absorbed type lightning rod according to the third embodiment of the present invention, and FIG. 8B shows the enlarged view of the absorbed type lightning rod of FIG. 8A.

Figure 8B:
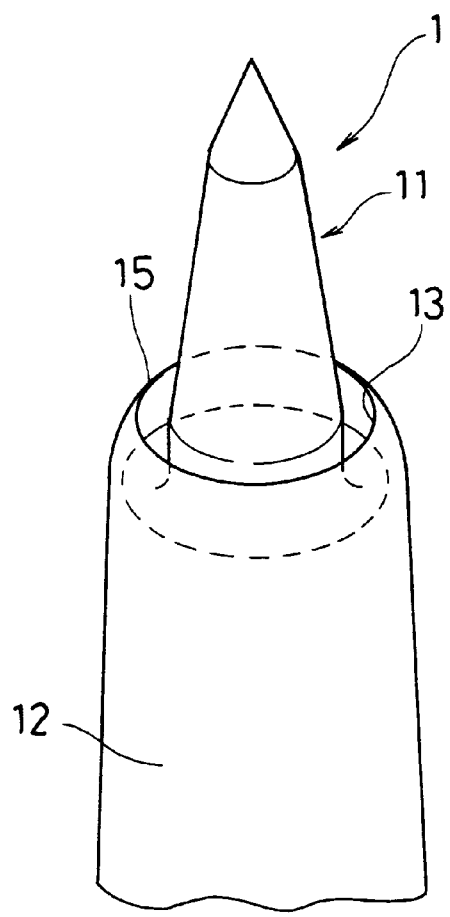

The absorbed type lightning rod 1 of the present embodiment is different from the absorbed type lightning rod 1 of the first embodiment in that the protrusion portion 15 the side view of this is pointed is formed at the periphery of the outer wall of the bowl-shaped receiving portion 13, shown in FIGS. 8A and 8B.

In this embodiment, because of the same reasons described in the first embodiment, the top of the protrusion portion is faced toward the primary rod 11. Accordingly, the lightning induction property of the primary rod 11 can be maintained, and the bowl-shaped receiving portion 13 can receive, absorb and conducts the splashed lightning current to the pole 12.

Figure 9A:
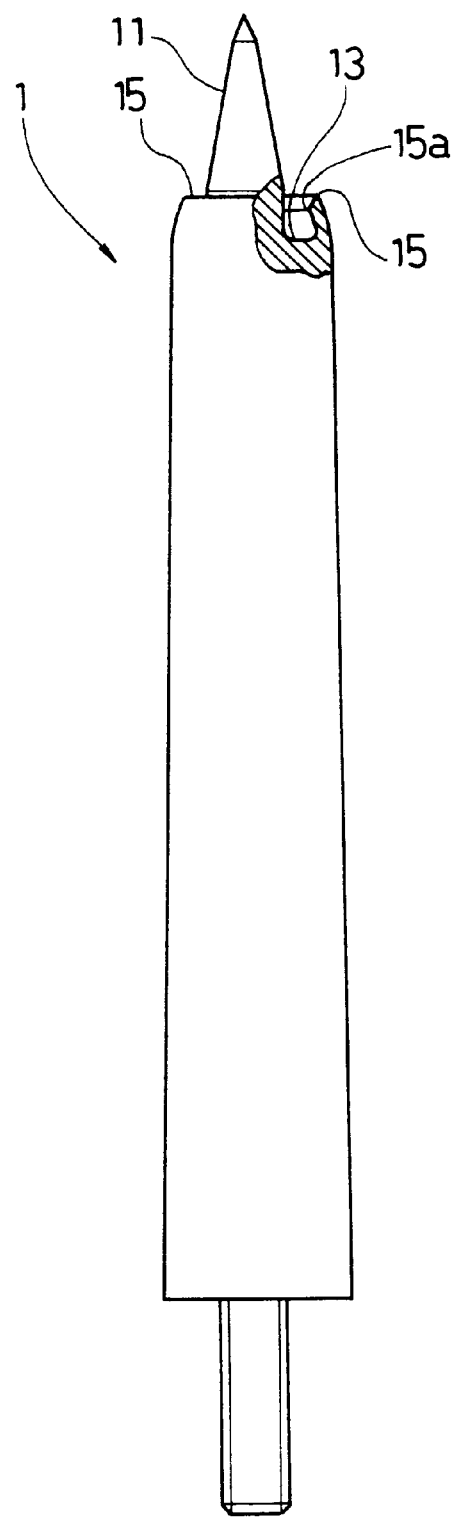
FIGS. 9A and 9B are views showing an absorbed type lightning rod according to the forth embodiment of the present invention.

Next, the forth embodiment of the absorbed type lightning rod will be described. FIG. 9A shows the absorbed type lightning rod according to the forth embodiment of the present invention, and FIG. 9B shows the enlarged view of the absorbed type lightning rod of FIG. 9A.

Figure 9B:
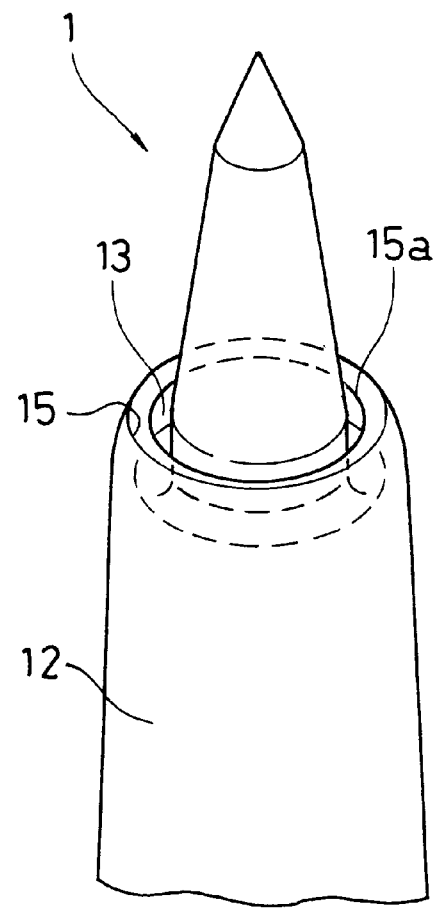

As shown in FIGS. 9A and 9B, the absorbed type lightning rod 1 of the present embodiment is that the additional protrusion is provided at the inner side of the periphery of the protrusion portion 15 described in the third embodiment. The point of the additional protrusion is faced toward the primary rod 11 so as to form an inward secondary point 15a. According to the present embodiment, as similar to the second embodiment, the splashed lightning current received by the bowl-shaped receiving portion 13 can efficiently be conducted to the pole 12 with the enhanced lightning induction property.

It should be noted that the primary rod 11 described in the first to forth embodiments can be formed together with the pole 12 or formed separately and welded to the pole 12. Further, in the first to forth embodiments, the absorbed type lightning rod 1 is chromed but the finishing can be modified unless the absorbed type lightning rod 1 is a conductor.

Next, the absorbed type lightning discharging device A will be described. As shown in FIG. 5, the absorbed type lightning rod 1 is placed on a building which is an object W to be protected, and coupled to an earth electrode 3 for accelerating discharge with the conducting unit 2. There placed a terminal 5 for measuring the earthing resistance at the conducting unit 2.

In order to install the absorbed type lightning rod 1, as shown in FIG. 6, the conducting unit 2 of the conducting rod is inserted to a fitting opening 16b of a coupling unit 16 which is formed at the end of the pole 12 and fixed with a bolt 16a. The conducting rod that is the conducting unit 2 is unrotatively supported by a plurality of L-shaped supports 17. The L-shaped support 17 is fixed to the object W to be protected with a bolt 17a. Any method can be employed for installing the absorbed type lightning rod 1 to the lightning protection facility unless the absorbed type lightning rod 1 is fixed with the primary rod 11 up and the pole 12 is conducted to the coupling unit 2.

The earth electrode 3 of this present embodiment is that the discharge efficiency is improved compared to the conventional earth electrode and it comprises a primary electrode and a discharge pointed rod. The earth electrode 3 can be formed in many ways. Some of the earth electrode 3 is described below.

Figure 10A:
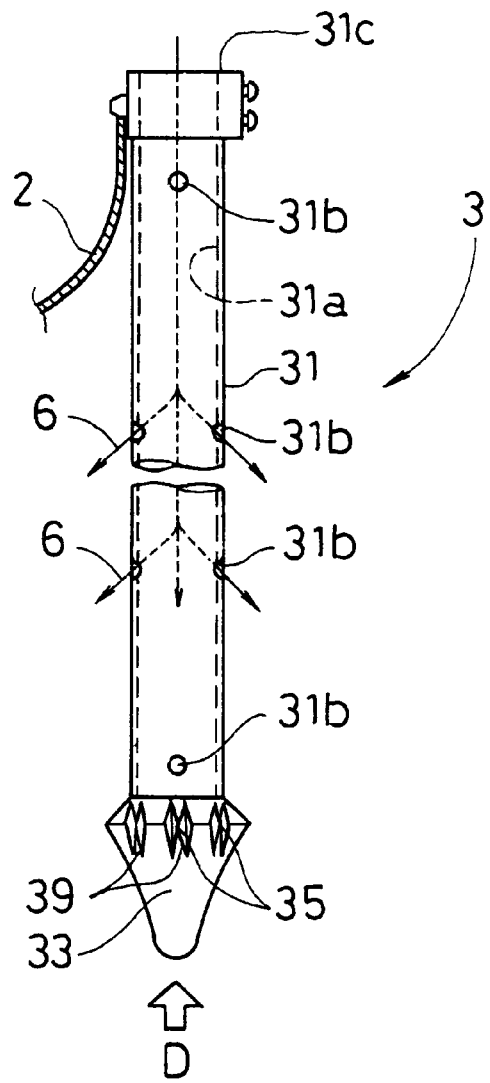
FIGS. 10A and 10B are views showing an earth electrode for accelerating the discharge.
Figure 10B:
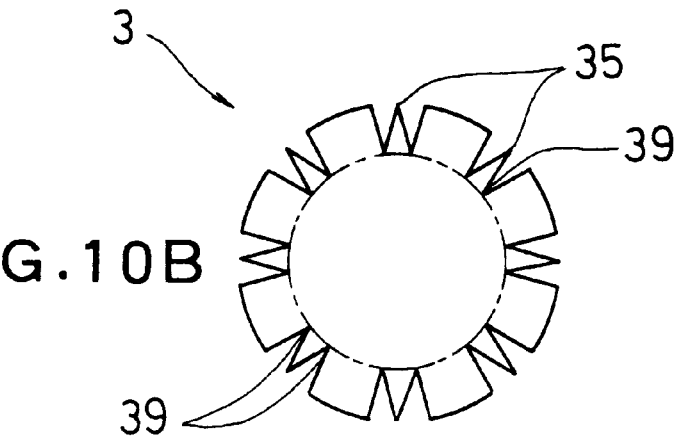

FIG. 10A is a side view of the earth electrode 3, and FIG. 10B is the earth electrode 3 seen from the D direction of FIG. 10A.

The earth electrode 3 comprises a primary electrode pipe 31 having a harpoon-shaped cap 33. In the primary electrode pipe 31, a passage 31a in which an earthing resistance reducing agent 6 flows (hereinafter called a reducing agent passage) and an outlet 31b from which the reducing agent flows (hereinafter called the reducing agent outlet).

It should be noted that the reducing agent 6 is to fill the gap between the earth electrode 3 and the ground to reduce the earthing resistance to enhance the discharge efficiency. In this embodiment, the reducing agent further prevents the rolling of the earth electrode and the corrosion of the earth electrode.

The cap 33 is substantially a circular cone having the rounded point and fitted to the base of the primary electrode pipe 31. The base of the cap 33 has a diameter larger than the diameter of the primary electrode pipe 31. The earth electrode 3 is driven to the ground so that the certain gap is formed between the primary electrode pipe 31 and the ground. Accordingly, the reducing agent 6 surrounds the primary electrode pipe 31 regardless of the position of the reducing agent outlet 31b. The cap 33 has notches 39 to form a plurality of pointed portions 35 to accelerate the discharge. The pointed portions 35 are equivalent to a discharge pointed rod and the primary electrode pipe 31 is equivalent to a primary electrode. It should be noted that the notches 39 reduce the earthing resistance when grounded to prevent the rotation due to the driving vibration.

Further, the earth electrode 3 has a head 31c to have durability against the driving and the conductor 2 which couples the absorbed type lightning rod 1 with the earth electrode 3 is connected to the head 31c.

Another kinds of the earth electrodes are shown in FIGS. 11, 12, 13, 14.

Figure 11:
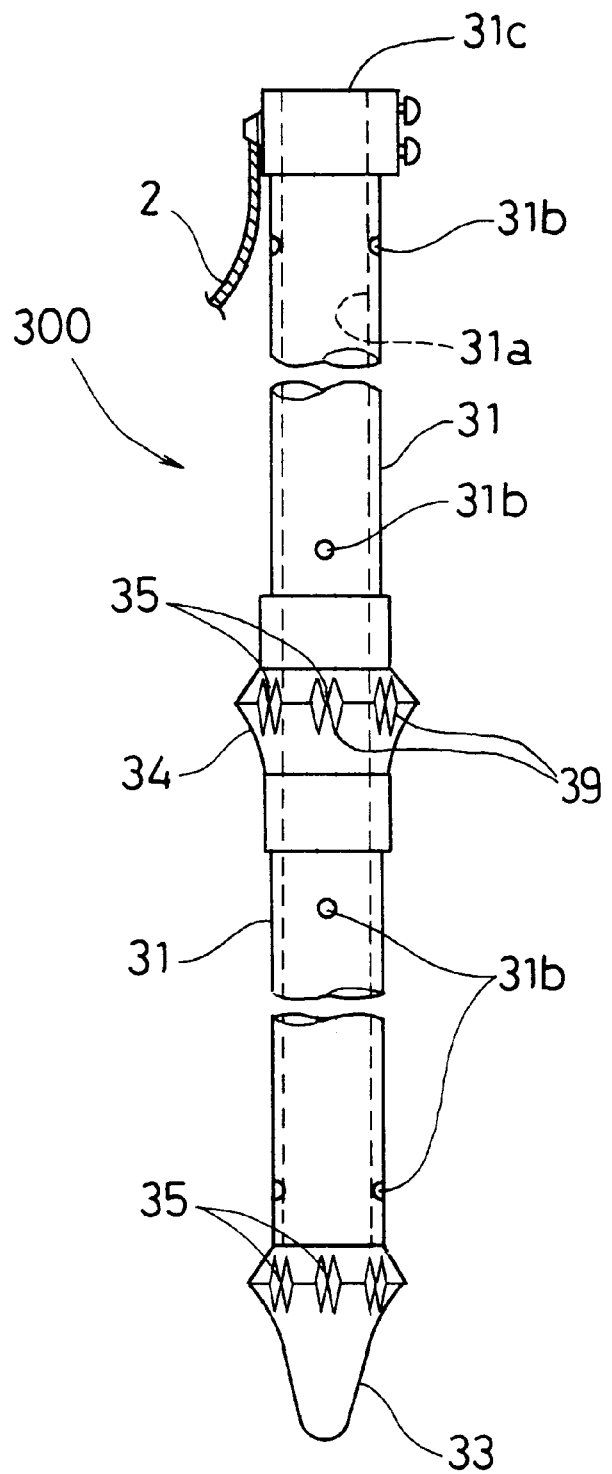
FIG. 11 is a schematic view showing another earth electrode for accelerating the discharge.

The earth electrode 300 shown in FIG. 11 is utilized in a case that the grounded area larger than the grounded area of FIG. 10A is required. The earth electrode 300 shown in FIG. 11 has the primary electrode pipe 31 longer than that of FIG. 10A, and the primary electrode pipe 31 is divided into plural portions which can be screwed to the other. Cap connections 34 are placed at each connection of the divided primary rods 31, and similar to the cap 33, notches 39 and pointed portions 35 are formed to the cap connections 34. The notches 39 and the pointed portions 35 have the same effects as the notches 39 formed in the cap 33. It should be noted that the divided rods 31 may have either the same diameter or the different diameter.

Figure 12:
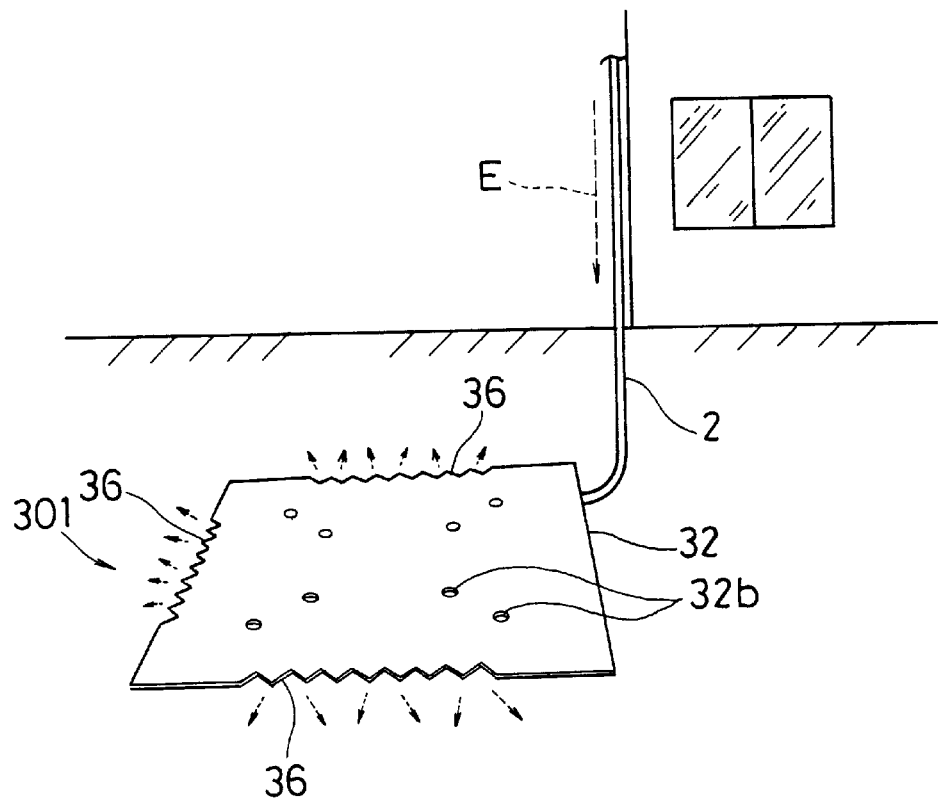
FIG. 12 is a schematic view showing another earth electrode for accelerating the discharge.

The another type of the earth electrode is shown in FIG. 12. The earth electrode 301 is that notches having a sharp corner 36 are made at the three edges of a primary electrode plate 32 of a plane conductor. Eight through holes 32b are formed in the electrode plate 32, so that when the resistance reducing agent is applied to the surface of the electrode plate 32, the resistance reducing agent also flows to the back of the electrode plate 32. The primary electrode plate 32 is equivalent to the primary electrode and the sharp corner 36 is equivalent to the discharge pointed rod.

Figure 13:
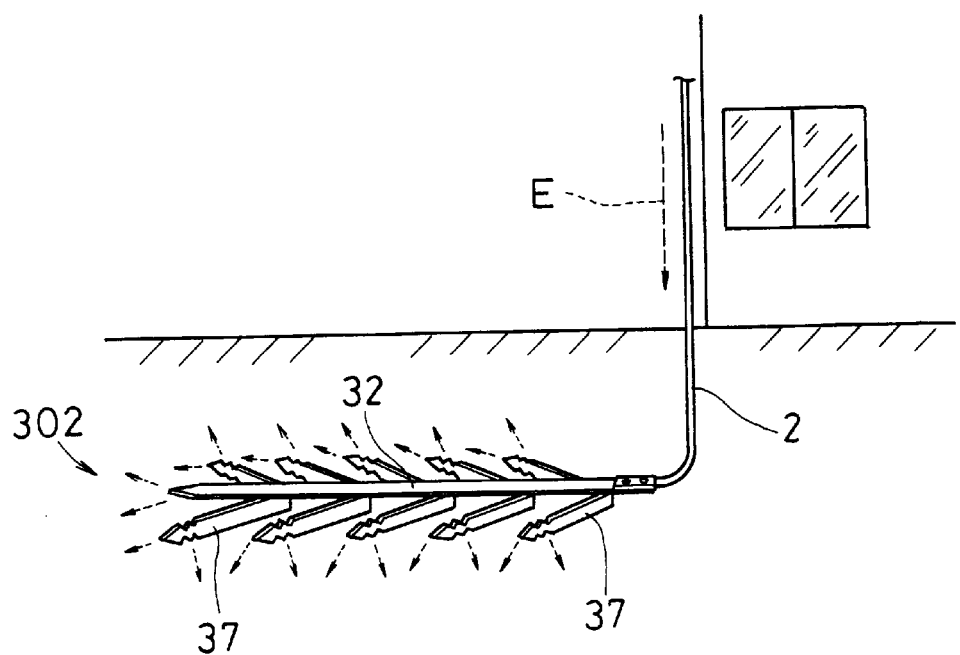
FIG. 13 is a schematic view showing another earth electrode for accelerating the discharge.

Further, the earth electrode 302 shown in FIG. 13 is that a plurality of long plates 37 having plural acute points are placed at the back of a long primary electrode plate 32. The long plates 37 opposed each other over the primary electrode plate 32 are spread and arranged in the forward direction of the lightning stroke current E to accelerate the discharge of the lightning stroke current E. In the earth electrode 302, the primary electrode plate 32 is equivalent to the primary electrode and the long plate 37 is equivalent to the discharge pointed rod.

Figure 14:
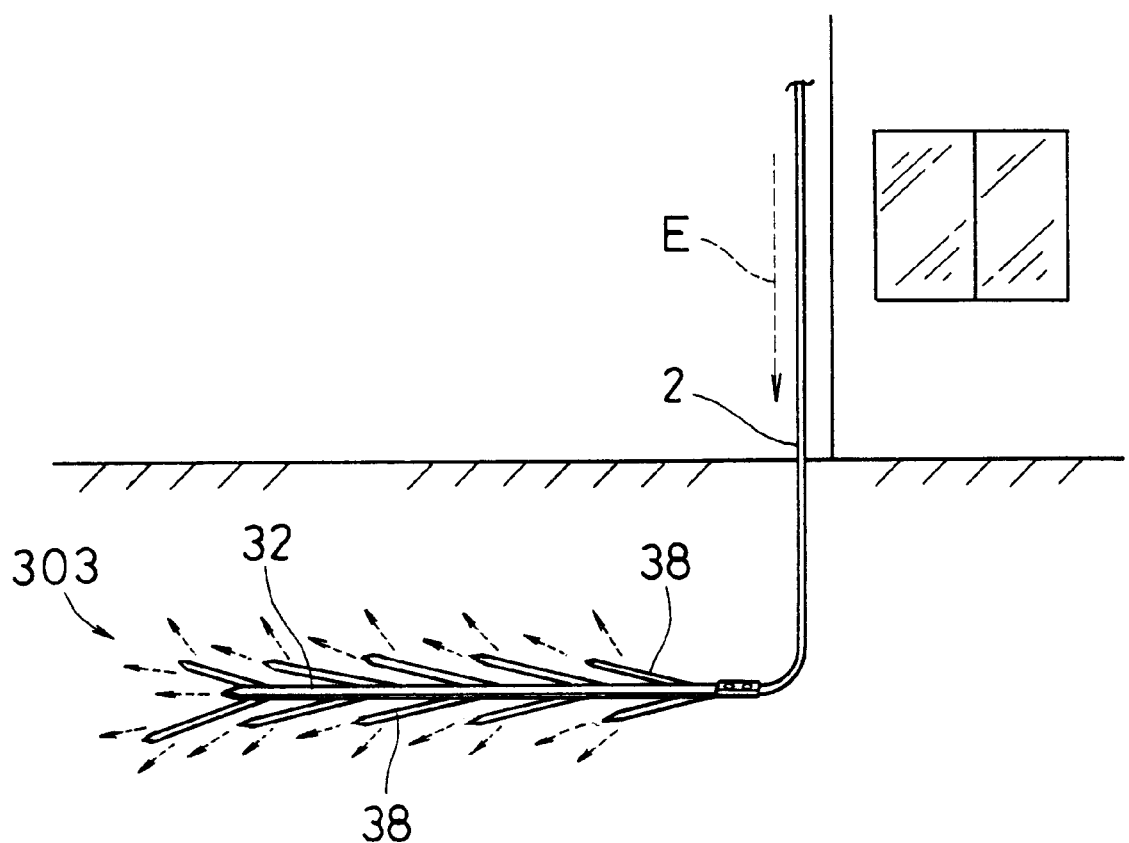
FIG. 14 is a schematic view showing another earth electrode for accelerating the discharge.

Furthermore, the another type of the earth electrode 303 shown in FIG. 14 will be described. The earth electrode 303 is that pointed rods 38 are provided to be opposed over a primary electrode plate 32 on the same plane as the grounded primary electrode plate 32. The pointed rods 38 are spread and arranged in the forward direction of the lightning stroke current E to accelerate the discharge of the lightning stroke current E.

There are many types of the earth electrodes and any type of the earth electrode can be used unless it has the primary electrode and the pointed discharge rod. Some kinds of the earth electrodes can be used together corresponding to the ground condition.

Next, the installation of the above-described earth electrodes into the ground will be described. In the case of the earth electrode 3, the head 31c of the earth electrode 3 connected to the conducting unit 2 is driven to the ground having the good earthing resistance condition by a driving device. While driving, the cap 33 can reach deep although there are the solid objects, e.g., rocks because the end of the cap 33 is rounded. After the cap 33 reaches the predetermined depth, the resistance reducing agent 6 is poured to the reducing agent passage 31a. Then, the reducing agent 6 leaks from the reducing agent outlet 31b and fills the gap between the earth electrode 3 and the ground. The earth electrode is installed by the driving, so that the conventionally performed boring is not required, which increases the working efficiency and which decreases the working cost.

In the case of the earth electrodes 300, 301, 302, 303, first the hole is dug in the ground having the good earthing resistance condition, and the earth electrode is laid down in the hole. Thereafter, the resistance reducing agent is poured into the hole if necessary. It should be noted that the adjustment of the earthing resistance can be performed by the same earth electrodes or the different earth electrodes.

Figure 15:
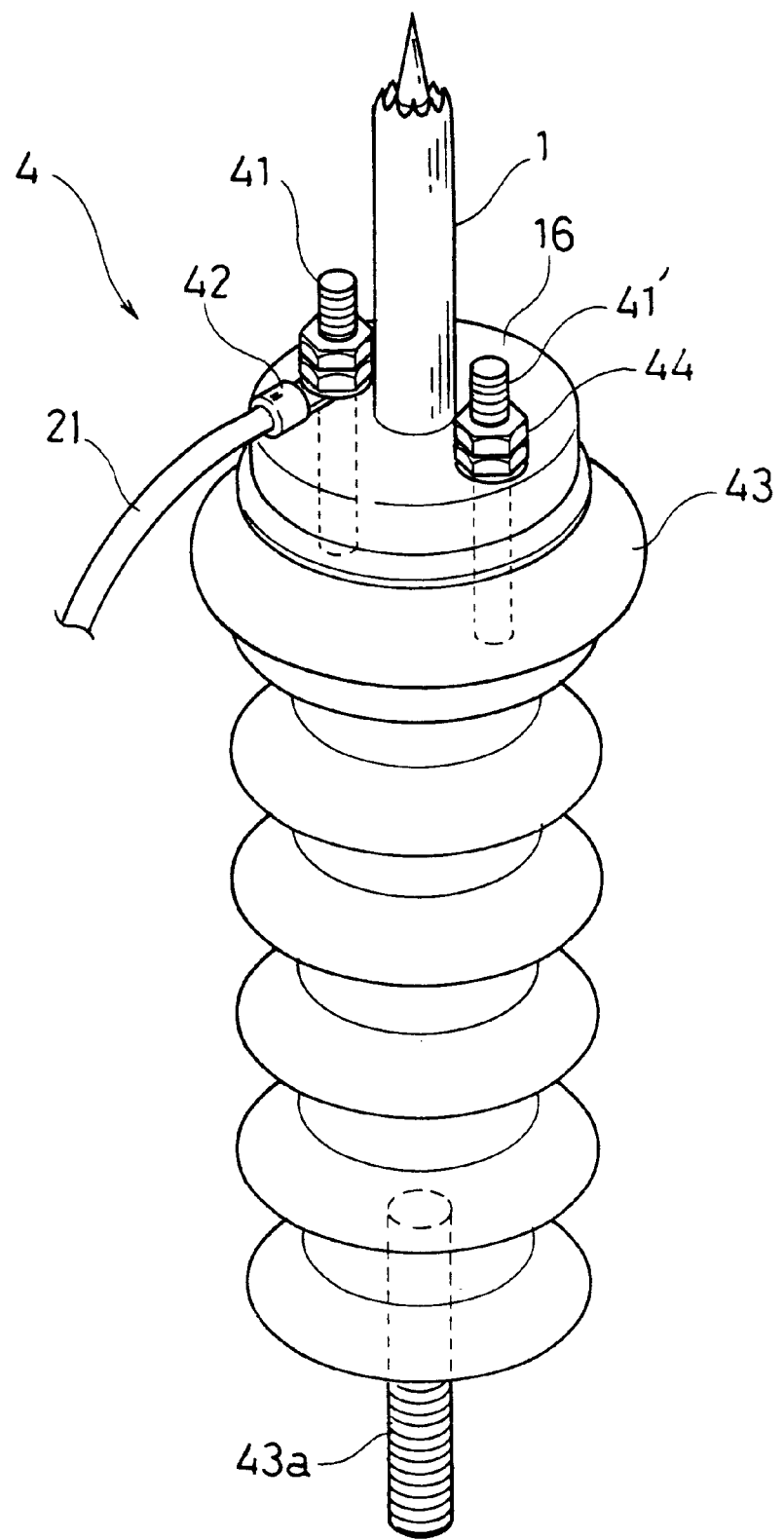
FIG. 15 is a schematic view showing an insulating attachment.

In the case that the object W to be protected is the normal buildings, the insulation between the absorbed type lightning rod 1 and the object W to be protected is not required. However, if the object W to be protected is the building that is easily influenced by the current, the weak leakage current has bad influence to the object W. As the countermeasure, in this case, the absorbed type lightning rod 1 is installed over an insulating attachment 4. FIG. 15 shows the insulating attachment 4. As shown in FIG. 15, a screw end 43a of a pedestal 43 that is an insulator is screwed into the object W to be protected and the absorbed type lightning rod 1 is placed at the other end of the insulating attachment 4. The end of the absorbed type lightning rod 1 is formed together with a circular plate 16 that is an inductor. The absorbed type lightning rod 1 is fixed at the circular plate 16 and the pedestal 43 by screwing two bolts 41, 41' and tightening the bolts with the nuts 44. A connection terminal 42 is placed to the bolt 41 and fixed by tightening the nut 44. Further, the conducting unit 2 is attached to the connection terminal 42 over a shielded conducting portion 21 with soldier.

The shielded conducting portion 21 is that the surface of the conducting unit 2 is covered with the insulator such as a vinyl and wrapped with a conducting tape to prevent the generation of the induced voltage due to the conducting unit 2. The conducting tape is insulated from the conducting unit 2 while it is connected and conducted to the earth electrode 3. With the shielded conducting portion 21, the leakage current from the conducting unit 2 is prevented. It should be noted that a spring and a washer are inserted between the nut 44 and the circular plate 16.

According to the lightning discharging device with the conventional earth electrode, since the absorbed type lightning rod 1 absorbs all lightning stroke current E, the secondary disaster due to the splashed lightning current E1 can be prevented. However, the potential is more instantly increased at the earth electrode, and the reverse current E2 is generated more at the earth electrode. Accordingly, the tertiary disaster cannot be prevented.

On the other hand, according to the lightning discharging device A with the earth electrode 3, 300, 301, 302, or 303 of the present invention, the discharge can be performed efficiently, so that the tertiary disaster due to the reverse current E2 can be prevented.

Further, when the insulating attachment 4 is used, in the case of the object to be protected that is easily influenced by the leakage current, any inconvenience due to the leakage current can be prevented.

While the invention has been shown and described with reference to the illustrated embodiments, it should be understood that various changes in form and details may be made without departing from the scope of the invention which is defined in the appended claims.

What is claimed is:

1. An absorbed typed lightning rod comprising:
   a pole having a conductivity;
   a circular cone primary rod having an acute point, provided at a top of said pole; and
   a secondary rod having an acute point lower than said primary rod, formed on a periphery of said primary rod at a same concentric circle as said primary rod; said secondary rod and said primary rod being separated by a bowl-shaped receiving portion.

2. An absorbed typed lightning rod according to claim 1, wherein a cone angle of a truncated cone of said primary rod is smaller than a point angle of said primary rod.

3. An absorbed typed lightning rod according to claim 1, wherein said secondary rod is constituted by a plurality of pointed portions formed by dividing an outer wall of said bowl-shaped receiving portion.

4. An absorbed typed lightning rod according to claim 1, wherein said secondary rod is constituted by a protrusion portion formed on a periphery of an outer wall of said bowl-shaped receiving portion.

5. An absorbed typed lightning rod according to claim 1, wherein said acute point of said secondary rod is faced toward said point of said primary rod.

6. An absorbed typed lightning rod according to claim 1, wherein an inward secondary point is formed at a periphery of said secondary rod so as to be faced toward said point of said primary rod.

7. An absorbed type lightning discharging apparatus comprising:

a pole having a conductivity;

a circular cone primary rod having an acute point, provided at the top of said pole; and a secondary rod having an acute point lower than said primary rod, formed on a periphery of said primary rod at a same concentric circle as said primary rod; said secondary rod and said primary rod being separated by a bowl-shaped receiving portion;

a conducting unit for conducting lightning discharge current received by said absorbed typed lighting discharging apparatus into ground; and a discharge accelerating earth electrode for smoothly and instantaneously discharging a lightning discharge current flown through said conducting unit into ground; said earth electrode comprising a primary electrode and a discharge pointed portion.

8. An absorbed type lightning discharging apparatus according to claim 7, wherein a gap between said discharge accelerating earth electrode and the ground is filled by an earthing resistance reducing agent.

9. An absorbed type lightning discharging apparatus according to claim 7, wherein said absorbed typed lightning discharging apparatus is fixed to an object to be protected over an insulating attachment formed of an insulator; and said conducting unit is a shielded conducting unit.

* * * * *